(No Model.)

R. F. HARGRAVES.
PULLEY.

No. 539,129. Patented May 14, 1895.

Witnesses
Charles Hannigan
Daniel W. Fink

Inventor
Robert F. Hargraves
by Warren R. Perce
Atty.

UNITED STATES PATENT OFFICE.

ROBERT F. HARGRAVES, OF PROVIDENCE, RHODE ISLAND.

PULLEY.

SPECIFICATION forming part of Letters Patent No. 539,129, dated May 14, 1895.

Application filed August 31, 1894. Serial No. 521,777. (No model.)

*To all whom it may concern:*

Be it known that I, ROBERT F. HARGRAVES, of the city and county of Providence, in the State of Rhode Island, have invented a certain new and useful Improvement in Pulleys; and I declare the following to be a specification thereof, reference being had to the accompanying drawings.

Like letters indicate like parts.

Figure 1:
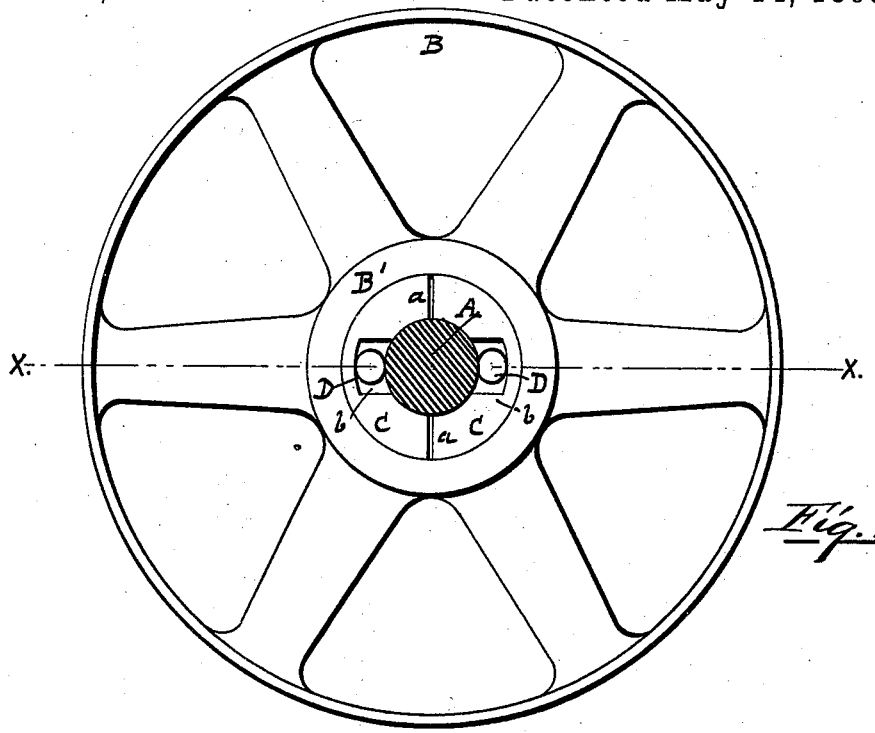
Figure 2:
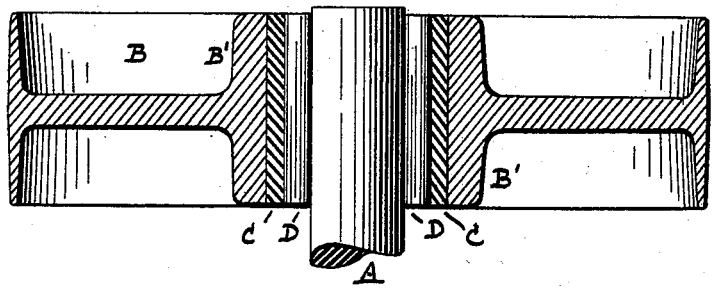
Figure 3:
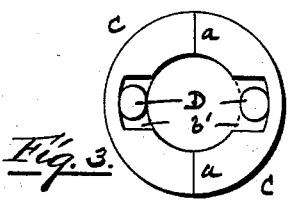
Figure 4:
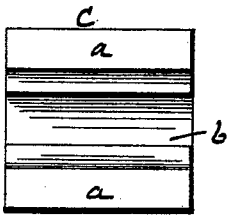
Figure 5:
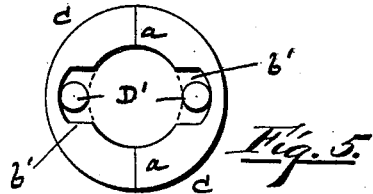

Figure 1 is a side elevation of my invention. Fig. 2 is a view of the same as seen on section line $x\,x$ of Fig. 1. Fig. 3 is a view in end elevation showing the split and slotted bushings for the pulley with the rollers in position therein. Fig. 4 is an elevation of one of the said bushings on the interior and plane faces thereof. Fig. 5 shows a modified form of my invention.

My invention relates to pulleys and the means of securing them in position upon a shaft.

It consists of the combination with a shaft and a pulley having a centrally bored hub, of a bushing made in two pieces to fit the bore of the pulley-hub and to surround the shaft, each of which pieces is provided with a slot, extending radially from the interior thereof, and two rollers, slightly elliptical in cross section, the minor axis of each of which rollers is such as to nearly equal the distance between the cylindrical surface of the shaft and the bottom of said slot, but whose major axis is longer than said distance, whereby said shaft, bushing and pulley are locked together by the frictional engagement of the rollers in said slots, respectively, as hereinafter particularly set forth.

In the drawings A represents the shaft, which is cylindrical in form.

B is the pulley having a hub B' with a central bore of a diameter considerably exceeding that of the shaft A.

C C are bushings in two parts, which, when butting each other on their plane interior faces $a$, have an exterior cylindrical surface quite closely fitting the bore of the hub of the pulley. The bushings C are of a length equal to the length of the bore of the hub. The bushings C C, when butting each other as aforesaid, have an interior opening or bore equal in diameter to the diameter of the shaft A. Each bushing C has a slot $b$, extending throughout its entire length, whose sides are in a direction at right angles with the line of the plane faces $a$ and whose bottoms are in the arc of a true circle concentric with the exterior and interior curves of said bushing.

Within each slot $b$ of the bushings C is placed a roller D of the same length as the bushing. It is slightly elliptical in cross section and its minor axis is such as to enable it to fit in the space between the surface of the shaft A and the curved bottom of the slot $b$ of the bushing, but its major axis exceeds in length the distance between said slot-bottom and said shaft.

The parts are assembled as shown in Figs. 1 and 2 and the result is that, when the shaft A is rotated, the rollers D roll slightly in the slots $b$ until their minor axes respectively turn out the true radial direction relatively to the shaft and then they force the bushings apart, as indicated by the double lines at $a$ in Fig. 1, so that said bushings are firmly held in frictional contact with the hub of the pulley and the rollers, so turned, hold the bushings and shaft firmly together.

To disengage the pulley from the shaft it is only necessary to push the rollers D lengthwise out of the bushings C C. The pulley is thus capable of being instantaneously secured to or loosened from the shaft at will.

By this device pulleys having hubs of different sizes and bores can be put in position upon a shaft by simply using bushings of the requisite diameter, and it is not necessary to carry in stock a large number of pulleys having bores of various sizes to fit shafts of various diameters, but by means of these interchangeable bushings the same pulley can be fitted up and secured to any shaft.

In Fig. 5 I show a modified form of my invention, in which the rollers D' are cylindrical and the bottom curve of the slot $b'$ is not concentric with the curves of the bushing, but eccentric thereto. The mode of application and operation however is the same as already described.

I claim as a novel and useful invention and desire to secure by Letters Patent—

1. The combination with a cylindrical shaft and a pulley having a centrally bored hub, of a bushing fitting said bore and shaft and provided with radial slots, whose bottoms are curved concentric with said shaft and bore and detachable rollers mounted in said slots, respectively, and made elliptical in cross section, all arranged and operating substantially as and for the purpose specified.

2. The combination with a cylindrical shaft and a pulley having a centrally bored hub, of radially split bushings fitting said bore and shaft and provided with radial slots having curved bottoms, and detachable rollers mounted in said slots, respectively, and adapted to spread said bushings apart and to frictionally lock the hub, bushings and shaft together, substantially as shown.

ROBERT F. HARGRAVES.

Witnesses:
 WARREN R. PERCE,
 DANIEL W. FINK.